(12) United States Patent
Thakkar et al.

(10) Patent No.: US 12,729,116 B2
(45) Date of Patent: Sep. 8, 2026

(54) ADSORBENT MATERIAL, ADSORPTION SYSTEM, AND ADSORPTION PROCESS FOR HYDROGEN RECOVERY

(71) Applicant: Air Products and Chemicals, Inc., Allentown, PA (US)

(72) Inventors: Jay A. Thakkar, Allentown, PA (US); Jeffrey R. Hufton, Fogelsville, PA (US); Timothy Christopher Golden, Nevez (FR); Garret C. Lau, New Tripoli, PA (US); Shubhra Jyoti Bhadra, Naperville, IL (US)

(73) Assignee: Air Products and Chemicals, Inc., Allentown, PA (US)

( * ) Notice: Subject to any disclaimer, the term of this patent is extended or adjusted under 35 U.S.C. 154(b) by 376 days.

(21) Appl. No.: 18/501,068

(22) Filed: Nov. 3, 2023

(65) Prior Publication Data

US 2025/0145460 A1 May 8, 2025

(51) Int. Cl.
*C01B 3/56* (2006.01)
*B01D 53/04* (2006.01)
(Continued)

(52) U.S. Cl.
CPC ............ *C01B 3/56* (2013.01); *B01D 53/0423* (2013.01); *B01D 53/047* (2013.01); *B01J 20/20* (2013.01); *B01J 20/28004* (2013.01); *B01J 20/28011* (2013.01); *B01J 20/28052* (2013.01); *B01J 20/28064* (2013.01); *B01J 20/28073* (2013.01); *B01D 2253/102* (2013.01); *B01D 2253/108* (2013.01); *B01D 2253/304* (2013.01);
(Continued)

(58) Field of Classification Search
None
See application file for complete search history.

(56) References Cited

U.S. PATENT DOCUMENTS 3,176,444 A 4/1965 Kiyonaga
3,252,268 A 5/1966 Stark
(Continued)

FOREIGN PATENT DOCUMENTS

CA 2357276 3/2002
CA 3160322 A1 * 6/2021 ............. C04B 22/10
(Continued)

OTHER PUBLICATIONS

Tsutomu Suzuki, et al, "Liquid phase adsorption of dyes and dextrans by crystallized mesoporous wood carbon obtained by nickel-catalyzed carbonization of larch at 900oC", The Wood Carbonization Research Society, 9 (1), 2012, 21-29.
(Continued)

*Primary Examiner* — Brit E. Anbacht
(74) *Attorney, Agent, or Firm* — Robert A. Diaz

(57) ABSTRACT

An adsorption system having at least one adsorber retaining a bed of adsorbent material can be configured to provide enhanced purification of fees having relatively low concentrations of hydrogen or helium. Embodiments can utilize an activated carbon layer between at least one upstream layer and at least one downstream layer. The activate carbon layer can include activated carbon can have a pre-selected surface area (SA), bulk density, total open pore volume (TOPV), and/or ratio of TOPV to surface area (TOPV/SA).

7 Claims, 8 Drawing Sheets

(51) Int. Cl.

| | |
|---|---|
| ***B01D 53/047*** | (2006.01) |
| ***B01J 20/20*** | (2006.01) |
| ***B01J 20/28*** | (2006.01) |

(52) U.S. Cl.

CPC .. *B01D 2253/306* (2013.01); *B01D 2253/311* (2013.01); *B01D 2256/16* (2013.01); *B01D 2257/102* (2013.01); *B01D 2257/504* (2013.01); *B01D 2257/7025* (2013.01); *C01B 2203/043* (2013.01)

(56) References Cited

U.S. PATENT DOCUMENTS

| | | | | |
|---|---|---|---|---|
| 3,430,418 | A | 3/1969 | Wagner | |
| 3,564,816 | A | 2/1971 | Batta | |
| 3,814,787 | A | 6/1974 | Carlsson | |
| 3,986,849 | A | 10/1976 | Fuderer et al. | |
| 4,026,680 | A | 5/1977 | Collins | |
| 4,077,780 | A | 3/1978 | Doshi | |
| 4,449,208 | A | 5/1984 | Moeckel et al. | |
| 4,472,178 | A | 9/1984 | Kumar et al. | |
| 4,541,851 | A | 9/1985 | Bosquain et al. | |
| 4,784,672 | A | 11/1988 | Sircar | |
| 4,923,843 | A | 5/1990 | Saforo et al. | |
| 4,963,519 | A | 10/1990 | Okabayashi et al. | |
| 4,971,605 | A | 11/1990 | Tarman | |
| 5,137,548 | A | 8/1992 | Grenier et al. | |
| 5,232,474 | A | 8/1993 | Jain | |
| 5,425,240 | A | 6/1995 | Jain | |
| 5,744,421 | A * | 4/1998 | Robinson | B01J 20/20 502/402 |
| 5,759,242 | A | 6/1998 | Smolarek et al. | |
| 5,846,295 | A | 12/1998 | Kalbassi et al. | |
| 5,855,650 | A | 1/1999 | Kalbassi et al. | |
| 5,917,136 | A | 6/1999 | Gaffney et al. | |
| 6,027,549 | A | 2/2000 | Golden et al. | |
| 6,086,659 | A | 7/2000 | Tentarelli | |
| 6,106,593 | A | 8/2000 | Golden et al. | |
| 6,152,991 | A | 11/2000 | Ackley | |
| 6,393,483 | B1 | 5/2002 | Latif et al. | |
| 6,402,813 | B2 | 6/2002 | Monereau et al. | |
| 6,506,236 | B2 | 1/2003 | Golden et al. | |
| 6,599,347 | B2 | 7/2003 | Kalbassi et al. | |
| 6,814,787 | B2 | 11/2004 | Golden et al. | |
| 6,866,075 | B2 | 3/2005 | Whitley et al. | |
| 7,022,159 | B2 | 4/2006 | Kalbassi et al. | |
| 7,285,154 | B2 | 10/2007 | Karwacki, Jr. et al. | |
| 7,404,846 | B2 | 7/2008 | Golden et al. | |
| 7,413,595 | B2 | 8/2008 | Schmidt et al. | |
| 7,537,742 | B2 | 5/2009 | Baksh et al. | |
| 7,591,992 | B2 | 9/2009 | Peng et al. | |
| 8,197,580 | B2 | 6/2012 | Hufton et al. | |
| 8,206,669 | B2 | 6/2012 | Schaffer et al. | |
| 8,262,783 | B2 | 9/2012 | Stoner et al. | |
| 8,268,044 | B2 | 9/2012 | Wright et al. | |
| 8,404,024 | B2 | 3/2013 | Henderson et al. | |
| 8,518,356 | B2 | 8/2013 | Schaffer et al. | |
| 8,535,414 | B2 | 9/2013 | Johnson et al. | |
| 8,574,346 | B2 | 11/2013 | Monereau et al. | |
| 8,734,571 | B2 | 5/2014 | Golden et al. | |
| 8,752,390 | B2 | 6/2014 | Wright et al. | |
| 8,795,411 | B2 | 8/2014 | Hufton et al. | |
| 8,814,985 | B2 | 8/2014 | Gerds et al. | |
| 8,940,263 | B2 | 1/2015 | Golden et al. | |
| 9,108,145 | B2 | 8/2015 | Kalbassi et al. | |
| 9,199,190 | B2 | 12/2015 | Malik et al. | |
| 9,631,864 | B2 | 4/2017 | Chen et al. | |
| 9,731,241 | B2 | 8/2017 | Kalbassi et al. | |
| 10,646,816 | B2 | 5/2020 | Zheng et al. | |
| 12,580,230 | B2 * | 3/2026 | Yao | H01M 10/4235 |
| 2011/0206581 | A1 | 8/2011 | Ackley et al. | |
| 2011/0219950 | A1 | 9/2011 | Rodrigues et al. | |
| 2017/0121186 | A1 * | 5/2017 | Fichtner | B01D 39/2058 |
| 2019/0247829 | A1 * | 8/2019 | Xiao | C01B 32/336 |
| 2019/0291078 | A1 | 9/2019 | Weist, Jr. et al. | |
| 2019/0300798 | A1 * | 10/2019 | Al-Hooshani | B01D 53/48 |
| 2023/0027070 | A1 | 1/2023 | Malik et al. | |
| 2024/0390835 | A1 * | 11/2024 | Golden | B01D 53/0423 |
| 2025/0145460 | A1 * | 5/2025 | Thakkar | B01J 20/28052 |

FOREIGN PATENT DOCUMENTS

| | | | |
|---|---|---|---|
| CN | 112169762 | 5/2021 | |
| DE | 202020107404 U1 * | 3/2022 | B24C 11/00 |
| EP | 1417995 | 5/2004 | |
| WO | 2022220828 | 10/2022 | |

OTHER PUBLICATIONS

A. Malek, et al, “Hydrogen Purification from Refinery Fuel Gas by Pressure Swing Adsorption”, AIChE Journal, vol. 44, No. 9, 1998, 1985-1992.

Clair Ducrot-Boisgontier, et al, “FAU-Type Zeolite Nanocasted Carbon Replicas for CO2 Adsorption and Hydrogen Purification”, Energy Fuels, 24, 2010, 3595-3602.

S. Sircar, et al, “Comments on Heterogeneity of Practical Adsorbents”, Ind. Eng. Chem. Res, 58, 2019, 10984-11002.

Stephen Brunauer, et al, “Adsorption of Gases in Multimolecular Layers”, Adsorption of Gases in Multimolecular Layers, Feb. 1938, 309-319.

R. Kumar, et al, “A Versatile Process Simulator for Adsorptive Separations”, Chemical Engineering Science, vol. 49, No. 18, 1994, 3115-3125.

Dong-Kyu Moon, et al, “H2 pressure swing adsorption for high pressure syngas from an integrated gasification combined cycle with a carbon capture process”, Applied Energy, 183, 2016, 760-774.

* cited by examiner

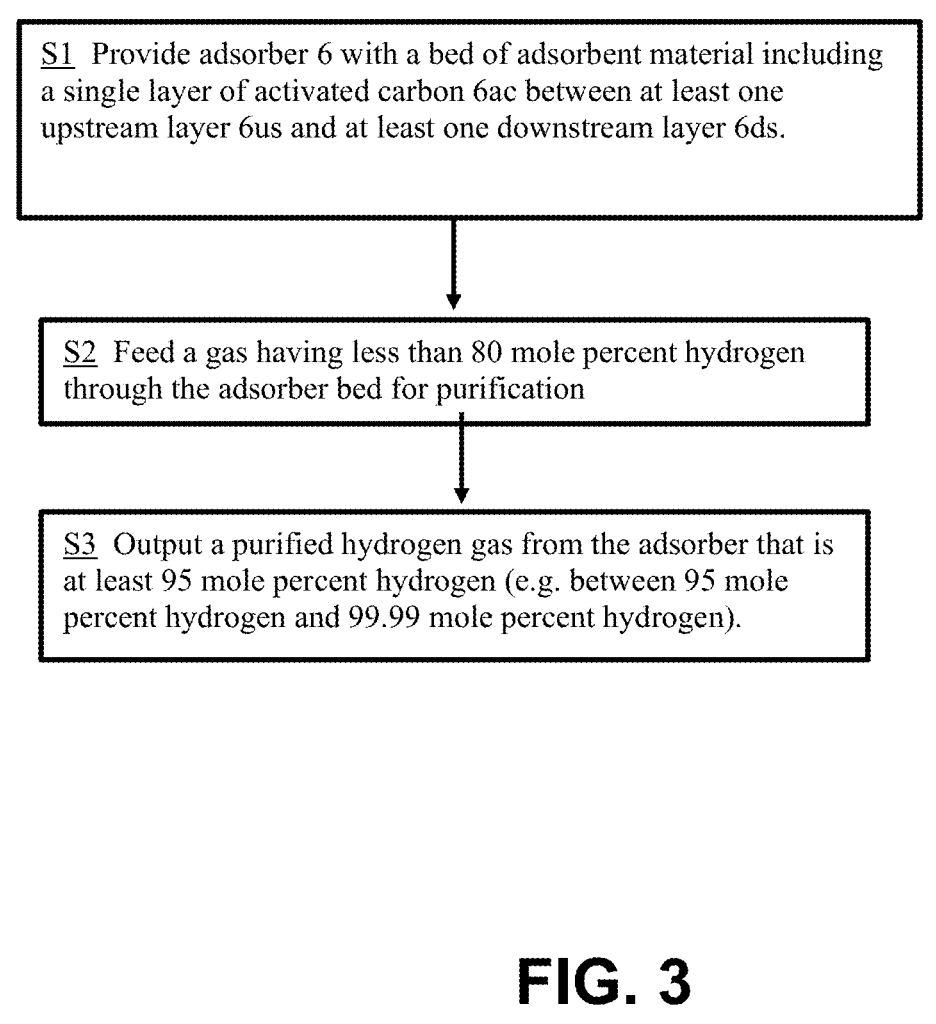

S1 Provide adsorber 6 with a bed of adsorbent material including a single layer of activated carbon 6ac between at least one upstream layer 6us and at least one downstream layer 6ds.

S2 Feed a gas having less than 80 mole percent hydrogen through the adsorber bed for purification S3 Output a purified hydrogen gas from the adsorber that is at least 95 mole percent hydrogen (e.g. between 95 mole percent hydrogen and 99.99 mole percent hydrogen).

FIG. 3

ADSORBENT MATERIAL, ADSORPTION SYSTEM, AND ADSORPTION PROCESS FOR HYDROGEN RECOVERY

FIELD

The present innovation relates to adsorbent material, adsorption systems, adsorption processes, adsorbers for purification of hydrogen product streams, and methods of making and using the same.

BACKGROUND

Adsorbers typically come in four different common configurations: vertical, vertical cross flow, horizontal, and radial. Examples of adsorbers, adsorption systems, and adsorbent materials that can be utilized in adsorbers can be appreciated from the disclosures of U.S. Pat. Nos. 3,176,444, 3,252,268, 3,430,418, 3,564,816, 3,986,849, 4,026,680, 4,077,780, 4,449,208, 4,472,178, 4,541,851, 4,784,672, 4,923,843, 4,963,519, 4,971,605, 5,137,548, 5,232,474, 5,425,240, 5,759,242, 5,846,295, 5,855,650, 5,917,136, 6,027,544, 6,086,659, 6,106,593, 6,152,991, 6,402,813, 6,506,236, 6,599,347, 6,814,787, 6,866,075, 6,893,483, 7,022,159, 7,285,154, 7,404,846, 7,413,595, 7,537,742, 7,591,992, 8,197,580, 8,206,669, 8,262,783, 8,268,044, 8,404,024, 8,518,356, 8,535,414, 8,574,346, 8,734,571, 8,752,390, 8,795,411, 8,814,985, 8,940,263, 9,108,145, 9,199,190, 9,631,864, 9,731,241, 10,646,816, U.S. Pat. App. Pub. Nos. 2011/0206581, 2011/0219950, 2019/0291078 and 2023/0027070, Canadian Patent Publication No. 2,357,276 A, Chinese Patent Publication No. CN112169762A and European Patent Publication No. EP 1 417 995 A1.

Thermal Swing Adsorption (TSA), Vacuum Swing Adsorption (VSA), Pressure Swing Adsorption (PSA), and Pressure Vacuum Swing Adsorption (PVSA) are adsorbent systems that can be utilized in different types of purification systems. For instance, PSA systems are used for the recovery and purification of gaseous products such as hydrogen.

SUMMARY

We have determined that PSA systems often have difficulty proficiently purifying hydrogen (H2) for feed streams having a relatively low hydrogen content. For instance, when hydrogen within a feed to be treated is under 80 volume percent (vol %), PSA systems can often need to have relatively large beds of adsorbent material for purifying the feed to form a suitable hydrogen product gas. This can result in high capital cost equipment for the PSA system as well as larger operational costs associated with low H2 recovery. In some situations, use of a PSA system may not be desired for a low hydrogen content feed due to such complications. This can reduce design flexibility for providing hydrogen product streams for different applications that may form a relatively low hydrogen content stream for purification.

We have developed embodiments for adsorbent material, adsorbers, and adsorption systems that can be configured for processing relatively low hydrogen content feeds (e.g. a feed having less than 80 vol % hydrogen). Embodiments can be adapted to help reduce adsorber sizing by providing adsorbent beds of improved efficiency for such applications and can also permit adsorption systems to be more broadly adapted for different hydrogen purification processing applications. For example, some embodiments can be adapted to provide improved productivity in producing hydrogen gas from a feed by providing an increase in the rate of hydrogen gas produced per volume unit of adsorbent material (e.g. a rate of hydrogen produced per hour per cubic meter of adsorbent bed material). This type of improvement can permit adsorbers of smaller size to be utilized which can reduce capital costs associated with adsorber equipment that may be utilized. In a retrofit situation, the higher H2 productivity can result in generating more revenue from H2 sales.

Embodiments can also provide improved recovery of hydrogen gas, which can permit the use of less fuel to make a given amount of hydrogen (e.g. reduce the amount of natural gas needed for producing hydrogen from a steam methane reforming (SMR) process, etc.). The improved recovery of hydrogen can help reduce fuel use as well as reduce carbon dioxide emissions associated with production of hydrogen in such processing.

In some embodiments, the bed of adsorbent material can be adapted to include multiple layers. Such a bed can include a single layer of activated carbon adsorbent material positioned between at least one upstream layer of adsorbent material and at least one downstream layer of adsorbent material. The adsorbent material of the upstream and downstream layers can be other types of adsorbent material. For instance, in some embodiments, the bed can include an alumina layer positioned upstream of the activated carbon layer for moisture removal layer (e.g. water removal) and a zeolite material layer that can be positioned downstream of the activated carbon layer for removal of carbon monoxide (CO), nitrogen (N2) and/or methane (CH4). The activated carbon layer can be sized for removal of carbon dioxide and a fraction of the methane within the feed in such a configuration.

As another example, some embodiments can utilize a bed that includes an alumina layer and a silica layer positioned upstream of the activated carbon layer for water and heavy hydrocarbon removal (hydrocarbons having four or more carbons) and a zeolite layer downstream of the activated carbon layer for removal of methane and nitrogen or removal of carbon monoxide, methane, and nitrogen. The activated carbon layer can be configured and sized for removal of ethane and propane in such a configuration.

Embodiments can be provided so that only a single activated carbon layer is utilized in the bed of adsorbent material. Also, the activated carbon can be configured to have a pre-selected surface area (SA), total open pore volume (TOPV), and ratio of TOPV to surface area (TOPV/SA) and be positioned so that the layer of the activated carbon has a pre-selected bulk density. For instance, embodiments can utilize an activated carbon layer in which the activated carbon has a ratio of TOPV/SA of between 0.59 nanometers (nm) and 0.83 nm when the SA ranges from 380 square meters per gram (m2/g) to 750 m2/g and the SA is determined based on the Brunauer, Emmett, and Teller ("BET") technique determined by nitrogen (N2) adsorption at 77 K as disclosed in S. Brunauer, P. H. Emmett, E. Teller, J. Am. Chem. Soc. 60, 1938, 309 (which is also referred to as "BET" or the "BET method") and the TOPV is determined from helium (He) density (crystal density) and mercury (Hg) density (particle density determined by mercury porosimetry), wherein the TOPV is determined by (1/[Hg density])−(1/[He density]) in units of cubic centimeters per gram (cc/g). The TOPV of the activated carbon in such embodiments can be 0.53 cc/g or less and more than 0 cc/g, can be less than 0.50 cc/g and more than 0 cc/g, can be between 0.45 cc/g and 0.62 cc/g or can be between 0.40 cc/g and 0.50 cc/g.

The ratio of TOPV/SA can be a relatively crude estimate of the average pore size of the activated carbon material. If it is assumed that the pores are cylindrically shaped, the total pore volume is given by $\pi r2h$ and the pore surface area by $2\pi rh$ (where r is the radius and h is the height, or length, of the pore). If the total pore volume is divided by the surface area the result is r/2. The average pore diameter under this type of assumption is four times the value of TOPV/SA, which indicates that an activated carbon with a value of TOPV/SA that is below 0.59 nm have average pores that are too small and those with a TOPV/SA value greater than 0.83 nm have average pores that are too large for embodiments that utilize an activated carbon having a TOPV/SA that is between 0.59 nm and 0.83 nm. This type of average pore size approximation can take into account the total pore volume of the activated carbon (micropores, mesopores, and macropores) and the total surface area. So, the value of the TOPV/SA can be an average pore size over a total pore structure that includes the micropores where the majority of adsorption can occur as well as mesopores and macropores that can be significant for mass transfer.

The bulk density of the activated carbon layer in some embodiments can be greater than 0.60 g/cc or can be between 0.53 g/cc and 0.62 g/cc when the bulk density is determined in accordance with ASTM International Standard D4164, rev 03, entitled Standard Test Method for Mechanically Tapped Packing Density of Formed Catalyst and Catalyst Carriers. ASTM International ("ASTM") was formerly known as the American Society for Testing and Materials.

In some embodiments, the activated carbon can also have a particle size of between 1 mm and 5 mm in diameter and/or a carbon dioxide (CO2) isosteric heat of adsorption at 0.5 millimole per gram (mmol/g) can be less than 5.59 kilocalories (kcal) per gram mole (gmol), which can also be referred to as less than 5.59 kcal/gmol or less than 23.39 kJ/gmol. In some embodiments, the activated carbon layer of the bed of material can also have a total column void fraction (internal and external) that is less than 0.72.

In a first aspect, an adsorber for an adsorption system is provided. The adsorber can include a vessel positionable to receive a fluid to purify the fluid. The vessel can have a bed of adsorbent material. The bed of adsorbent material can include an activated carbon layer including activated carbon. The activated carbon of the activated carbon layer can have (i) a surface area (SA) that ranges from 380 square meters per gram (m2/g) to 750 m2/g and (ii) a total open pore volume (TOPV) to SA ratio (TOPV/SA), which has a value greater than 0.59 nm and less than 0.83 nm.

In a second aspect, the activated carbon of the activated carbon layer can also have other properties. For example, the activated carbon of the activated carbon layer can also have (iii) a carbon dioxide (CO2) isosteric heat of adsorption at 0.5 mmol/g surface coverage that can be less than or equal to 23.39 kilojoules per mole (kJ/mol) and (iv) a TOPV that is 0.53 cubic centimeters per gram (cc/g) or less.

A bulk density of the activated carbon layer can also be greater than or equal to 0.60 grams per cubic centimeter (g/cc). Alternatively, the activated carbon layer can have a bulk density that is between 0.53 g/cc and 0.62 g/cc.

Other embodiments can also be provided in which the activated carbon of the activated carbon layer also has (v) a particulate size range that is between 1 millimeter (mm) in diameter and 5 mm in diameter.

In some embodiments, the activated carbon can have a CO2 isosteric heat of adsorption at 0.5 mmol/g surface coverage that can be less than or equal to 23.39 kJ/mol and greater than 0 kJ/mol and/or a TOPV that is between 0.50 cc/g and 0.40 cc/g. In other embodiments, the activated carbon can have a CO2 isosteric heat of adsorption can be 0.5 mmol/g surface coverage that can be less than or equal to 23.39 kJ/mol and greater than 0 kJ/mol and/or a TOPV that is between 0.45 cubic centimeters per gram (cc/g) and 0.62 cc/g.

In yet other embodiments, the activated carbon can have a TOPV that is between 0.40 cc/g and 0.50 cc/g.

In a third aspect, the adsorber can be for an adsorption system that is configured as a pressure swing adsorption (PSA) system.

In a fourth aspect, the bed of adsorbent material can also have at least one downstream layer positioned downstream of the activated carbon layer and the bed of adsorbent material can only have a single activated carbon layer (which can be the activated carbon layer).

In a fifth aspect, the bed of adsorbent material can also have at least one downstream layer positioned downstream of the activated carbon layer and at least one upstream layer positioned upstream of the activated carbon layer. The bed of adsorbent material can only have a single activated carbon layer (which can be the activated carbon layer).

In a sixth aspect, the bed of adsorbent material can be configured to purify a feed fluid flow of hydrogen having a hydrogen content of less than 79 volume percent (vol %) to output a purified fluid flow having a hydrogen content of greater than or equal to 95 vol % (e.g. between 95 vol % hydrogen and 100 vol % hydrogen). A hydrogen content of less than 79 vol % can be a concentration of between 79 vol % and greater than 0 vol % or a hydrogen concentration of between 79 vol % and 50 vol %.

In a seventh aspect, the adsorber of the first aspect can include one or more features of any of the second aspect, third aspect, fourth aspect, fifth aspect, and/or sixth aspect. It should therefore be appreciated that other embodiments can utilize other combination of features. Examples of such combinations of features can be appreciated from the exemplary embodiments discussed herein, for instance.

In an eighth aspect, an adsorption system can be provided that can include at least one adsorber. The system can include at least one embodiment of the adsorber, at least two such absorbers, or an array of absorbers (e.g. between 2 and 20 adsorbers or between 2 and 12 adsorbers, etc.). In some embodiments, the adsorption system can be a PSA system.

In a ninth aspect, a process for adsorption is provided. An embodiment of this process can use at least one embodiment of our adsorber. In some embodiments, the process can include positioning a bed of adsorbent material within a vessel of an adsorber wherein the bed of adsorbent material comprises an activated carbon layer including activated carbon. The activated carbon of the activated carbon layer can have (i) a surface area (SA) that ranges from 380 m2/g to 750 m2/g; and (ii) a total open pore volume (TOPV) to SA ratio (TOPV/SA), which has a value greater than 0.59 nm and less than 0.83 nm. The process can also include passing a feed fluid flow through the bed of adsorbent material to purify the feed fluid and outputting a purified fluid flow from the vessel after the feed fluid flow has passed through the bed of adsorbent material.

In a tenth aspect, the feed fluid can have a hydrogen content of less than 79 vol % to output a purified fluid flow having a hydrogen content of greater than or equal to 95 vol % (e.g. between 95 vol % and 100 vol %, etc.)

In an eleventh aspect, the activated carbon can have other properties. For example, the activated carbon can have (iii) a carbon dioxide (CO2) isosteric heat of adsorption at 0.5 mmol/g surface coverage that can be less than or equal to 23.39 kJ/mol and greater than 0 kJ/mol and (iv) a TOPV that is 0.53 cubic centimeters per gram (cc/g) or less. As another example, the activated carbon can also (or alternatively) have (v) a TOPV that is between 0.50 cubic centimeters per gram (cc/g) and 0.40 cc/g or between 0.45 cc/g and 0.62 cc/g and/or (vi) a particulate size range that is between 1 millimeter (mm) in diameter and 5 mm in diameter.

In some embodiments, the activated carbon layer has a bulk density that is greater than or equal to 0.60 grams per cubic centimeter (g/cc) or can have a bulk density that is between 0.53 g/cc and 0.62 g/cc.

In a twelfth aspect, the process of the ninth aspect can include one or more features of any of the tenth aspect and/or the eleventh aspect. It should therefore be appreciated that other embodiments can utilize other combination of features. Examples of such combinations of features can be appreciated from the exemplary embodiments discussed herein.

Other details, objects, and advantages of our adsorbent material, adsorbers, adsorption systems, adsorption processing, and methods of making and using the same will become apparent as the following description of certain exemplary embodiments thereof proceeds.

BRIEF DESCRIPTION OF THE DRAWINGS

Exemplary embodiments of adsorbent material, adsorbers, adsorption systems, adsorption processing, and methods of making and using the same are shown in the drawings included herewith. It should be understood that like reference characters used in the drawings may identify like components.

FIG. 3 is a flow chart illustrating an exemplary embodiment of a process for forming a purified product stream.

DETAILED DESCRIPTION OF EXEMPLARY EMBODIMENTS

Figure 1:
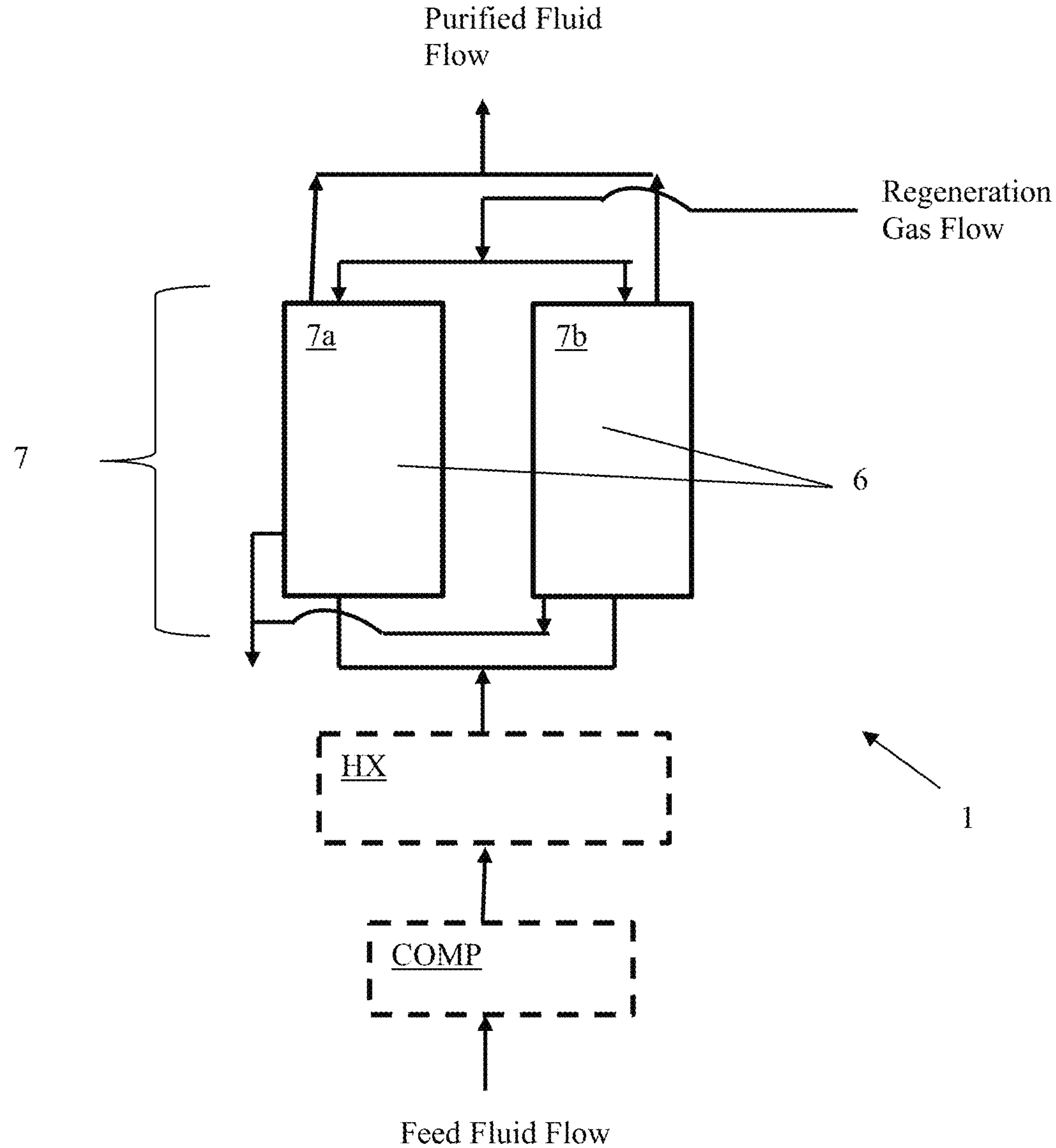
FIG. 1 is a block diagram of a first exemplary embodiment of an adsorption system.
Figure 2:
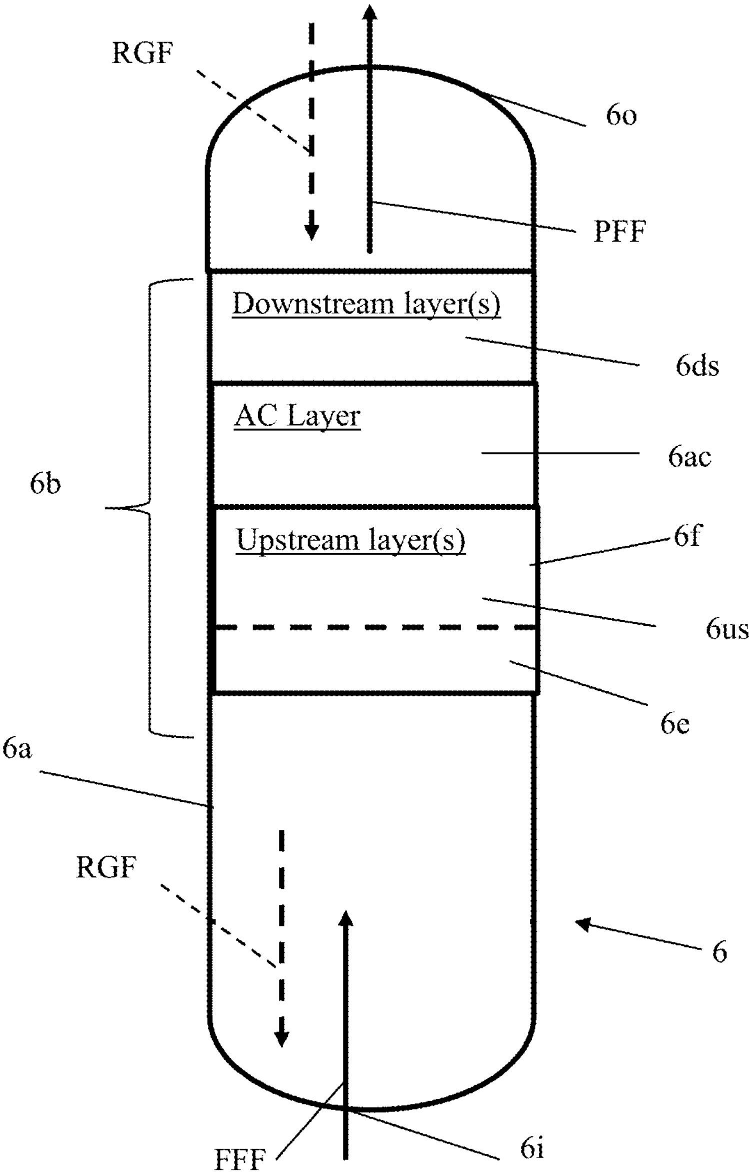
FIG. 2 is a schematic diagram of a first exemplary embodiment of an adsorber that can be utilized in the first exemplary embodiment of the adsorption system.

Referring to FIGS. 1 and 2, an exemplary embodiment of an adsorption system 1 can include a set 7 of multiple adsorbers 6. Each adsorber 6 of the adsorption system 1 can include a bed 6*b* of adsorbent material within a vessel 6*a* of the adsorber 6. The bed 6*b* of adsorbent material can include one or more layers of adsorbent material that can remove multiple target elements from a compressed feed that is to be fed to the adsorber for purification via adsorption (e.g., exposure to adsorbent material that can include one or more layers of adsorbent material). The adsorbent material within the bed 6*b* can be solid particulate material or include solid particulate material (e.g. alumina, silica gel, activated carbon, zeolite material, etc.).

The adsorbers 6 of the adsorption system 1 can include a first adsorber 7*a* and a second adsorber 7*b*. The first and second adsorbers 7*a* and 7*b* can each be configured as a vertical adsorber, a horizontal adsorber or other type of adsorber (e.g., a vertical cross flow adsorber or a radial adsorber, etc.). In some arrangements, the adsorbers can be configured such that the feed flow comes in from the bottom of the adsorber vessel and the output flow is output out the top of the vessel 6*a* or such that the feed flow comes in from the top of the vessel and the output flow is passed out of the bottom of the vessel 6*a*. Yet other adsorbers can be configured as radial adsorbers or horizontal adsorbers.

Embodiments of the adsorption system 1 can include a set 7 of multiple adsorbers 6 that includes more than two adsorbers 6. For instance, a set 7 of multiple adsorbers can include ten adsorbers 6, between two adsorbers and twelve adsorbers, or include between four adsorbers and twenty adsorbers 6.

The arrangement of adsorbers 6 can be configured to utilize a pressure swing adsorption (PSA) process such as a PSA process or a vacuum PSA (VPSA) process. FIG. 2 illustrates an exemplary embodiment of an adsorber 6 that can be utilized in the system.

The first and second adsorbers 7*a* and 7*b* can be arranged so that they operate in parallel such that when the first adsorber 7*a* is on-stream carrying out purification processes by adsorbing target materials from the fluid fed to the adsorption system 1, the second adsorber 7*b* can be off-stream so that it can undergo desorption via a regeneration gas flow for regeneration of the bed 6*b* of adsorbent material of the off-stream second adsorber 7*b*. When in an off-stream state, the second adsorber 7*b* may not receive fluid for purification of the fluid. Instead, the off-stream state adsorber can receive a regeneration gas flow (RGF) for facilitating desorption of the adsorbent material of the bed 6*b* of adsorbent material to regenerate the adsorbent material.

When the second adsorber 7*b* is on-stream carrying out purification processes by adsorbing target materials from the feed fluid flow (FFF) to form a purified fluid flow (PFF), the first adsorber 7*a* can be off-stream so it can undergo desorption, or regeneration, for regeneration of the bed 6*b* of adsorbent material of the adsorber 6. When in an off-stream state, the first adsorber 7*a* may not receive fluid for purification of the fluid. Instead, the off-stream state adsorber can undergo a reduction in pressure and/or also receive a regeneration gas flow (RGF) for facilitating desorption of the adsorbent material of the bed 6*b* of adsorbent material to regenerate the adsorbent material.

A regeneration gas flow can be fed to the off-stream state adsorber(s) after reducing pressure of the adsorber to regenerate the adsorbent material of the adsorber so that the impurities adsorbed in the adsorbent material are released and output from the adsorber 6 via the regeneration gas. The output regeneration gas can be emitted to atmosphere or otherwise treated.

It should be appreciated that when an adsorber 6 is in an off-stream state, it can undergo a regeneration process, or desorption process, to regenerate the one or more layers of adsorbent material within the adsorber. When returned to the on-stream state, the adsorber can operate with improved efficiency due to the regeneration of the adsorbent material as the regeneration of the material can return that material to a condition that is close to or at its original state for adsorption of target material from a feed fluid flow.

FIG. 2 illustrates an example of how a feed fluid flow can be passed into the vessel 6*a* of the adsorber 6 as an inlet fluid flow feed (FFF) for being passed into contact with the bed 6*b* of adsorbent material for purification. The purified fluid can then be output as a purified fluid flow PFF via an outlet 60 of the adsorber 6. An example of the use of a regeneration gas flow (RGF) and how it can flow in an opposite direction may also be best appreciated from FIG. 2.

In some embodiments, the adsorption system 1 can include a compressor (COMP) for increasing the pressure of the feed fluid flow (FFF) for feeding to one or more on-state adsorbers for forming the purified feed flow (PFF) with impurities removed from the feed fluid flow. Embodiments can also include a heat exchanger (HX) positioned between the compressor (COMP) and one or more adsorbers 6 for heating or cooling the compressed feed fluid flow to a pre-selected adsorber feed temperature for feeding to the adsorber(s) 6 in the on-stream state of the adsorption system for undergoing purification therein.

In other embodiments, the compressor and/or heat exchanger upstream of the adsorbers may not be needed or used. For example, in some implementations, the fluid to be fed to the one or more on-state adsorbers of the adsorption system can be output from an upstream device (e.g. reactor, separation vessel, knockout tank, etc.) at a suitable pressure and/or temperature for undergoing purification within the adsorber(s) 6.

The adsorption system 1 can be configured so that the input of fluid into the first adsorber 7*a* or second adsorber 7*b* is changed (e.g. via valve position changes, etc.) to switch the parallel adsorbers between their on-stream states and their off-stream states (e.g. when the first adsorber 7*a* is on-stream, the second adsorber 7*b* can be off-stream and vice versa). The regeneration gas flow RGF (shown in broken line in FIG. 2) that is passed through the adsorber 6 for regeneration of the adsorbent material can be gas obtained via a product flow output from a column, a product gas tank, or can be gas from another source of a plant or apparatus.

For at least some embodiments, the regeneration gas flow (RGF) can pass through the vessel 6*a* of an absorber 6 along a flow path that is the reverse of the flow path of fluid passed through the vessel of the adsorber when the adsorber is in the on-stream state. For such embodiments, the inlet 6*i* of the vessel 6 through which the feed fluid flow can pass into the vessel 6*a* when the adsorber 6 is in the on-stream state may function as an outlet for the regeneration gas and the outlet 60 of the vessel through which the purified fluid flow can be output during the on-stream state may function as an inlet for the regeneration gas.

Each adsorber 6 (e.g., first adsorber 7*a*, second adsorber 7*b*, etc.) can include a bed 6*b* of adsorbent material retained within a vessel 6*a* that includes one or more layers of adsorbent material. At least one activated carbon layer (AC Layer) 6*ac* can be included in the bed 6*b* of adsorbent material. The bed 6*b* can also include at least one downstream layer 6*ds* that is downstream of the activated carbon layer 6*ac* and at least one upstream layer 6*us* that is upstream of the activated carbon layer 6*ac*. The upstream term of the upstream layer 6*us* can refer to the position of that layer relative to the activated carbon layer when the bed 6*b* of adsorbent material is in contact with the feed fluid flow (FFF) for adsorption of impurities from the feed to form the purified fluid flow (PFF). Similarly, the downstream term of the downstream layer 6*ds* can refer to the position of that layer relative to the activated carbon layer when the bed 6*b* of adsorbent material is in contact with the feed fluid flow (FFF) for adsorption of impurities from the feed to form the purified fluid flow (PFF).

The upstream layer(s) 6*us* can include a first upstream layer 6*e* that is upstream of a second upstream layer 6*f* that is positioned between the first upstream layer 6*e* and the activated carbon layer 6*ac*. The upstream layer 6*us* can alternatively only include a single upstream layer 6*us*. The downstream layer 6*ds* can be a single layer or can include multiple downstream layers of different adsorbent materials as well.

In some embodiments, the upstream layer 6*us* can include a first layer of alumina and a second layer of silica. The layer of alumina can be configured for removal of water or water and heavy hydrocarbons (e.g. hydrocarbons having six or more carbons) from the feed fluid flow and can be upstream of the layer of silica. The layer of silica can be positioned and configured for removal of pentane and butane from the feed fluid flow (e.g. removal of a substantial portion of the pentane and butane, removal of a bulk of the pentane and butane, etc.). The downstream layer(s) 6*ds* can include a layer of zeolite material that is configured to adsorb methane and nitrogen (N2). The activated carbon layer 6*ac* can be configured to remove propane and ethane from the feed fluid flow (FFF) and can be positioned between the silica layer and the zeolite layer (e.g. removal of a substantial portion of the propane and ethane, removal of a bulk of the propane and ethane, etc.). This type of embodiment can be utilized for purification of refinery off gas that may have a substantial content of hydrocarbons, water, and N2, for example. The adsorption of the impurities can permit a feed having less than 80 volume percent (vol %) of hydrogen to be purified so the purified fluid flow (PFF) has a hydrogen (H2) content of over 90 vol % (e.g. between 95 vol % H2 and 100 vol % H2 or greater than 95 vol % H2 to 99.999 vol % H2).

In other embodiments, the bed 6*b* can include an upstream layer 6*us* of alumina for adsorption of water and a downstream layer 6*ds* of a zeolite material for removal of carbon monoxide (CO) and N2. The activated carbon layer 6*ac* can be between these layers and be configured for adsorption of carbon dioxide (CO2) and methane from the feed fluid flow FFF. Such an embodiment can be utilized for steam methane reforming or steam reforming applications for purification of a feed gas that includes hydrogen and impurities that include CO2, water, CO, and N2. The hydrogen content of the feed fluid flow FFF can be less than 80 vol % and greater than 50 vol %. For instance, the hydrogen content of the feed fluid flow can be between 79 vol % and 70 vol %, between 79 vol % and 60 vol %, or be less than 78.46 vol % and greater than 50 vol %. The purified fluid flow output from the adsorber can be purified hydrogen that has a hydrogen content of over 90 vol % (e.g. between 95 vol % and 100 vol % or greater than 95 vol % to 99.999 vol %).

The bed 6*b* of the adsorbent material can be positioned in the vessel 6*a* so that each layer directly contacts a downstream layer. For instance, an upstream layer 6*us* can have a downstream end that interfaces with the upstream end of the activated carbon layer 6*ac* and a downstream layer 6*ds* can have an upstream end that interfaces with the downstream end of the activated carbon layer 6*ac*. In such embodiments, the activated carbon layer 6*ac* can be in contact with a downstream layer 6*ds* at its downstream end and also in contact with an upstream layer 6*us* at its upstream end when positioned in the bed 6*b* of adsorbent material.

Other embodiments can utilize additional layers or a different arrangement of layers. For instance, some embodiments can include an activated carbon layer 6*ac* positioned between an upstream layer 6*us* of silica and a downstream layer of a zeolite or other adsorption media. As another example, some embodiments may not include an upstream layer such that the activated carbon layer is the upstream-most layer of the bed 6*b* of adsorbent material. As yet another example, the bed 6*b* of adsorbent material can be configured so that the activated carbon layer 6*ac* is the only layer of the bed 6*b* of adsorbent material. As yet another example, the bed 6*b* of adsorbent material can include one or more upstream layers 6*us* and have the activated carbon layer 6*ac* as the final, most downstream layer of the bed 6*b*.

The activated carbon layer 6*ac* of the bed 6*b* can be the only layer of activated carbon in the bed 6*b* of adsorbent material in some embodiments. The activated carbon can also be configured to help permit the bed 6*b* of adsorbent material to be sized to facilitate use of a suitably sized vessel 6*a* for purification of the feed fluid flow for forming the purified feed flow.

In some embodiments, the adsorption system 1 can be configured for helium purification. In such embodiments, the feed fluid flow (FFF) can include helium (He) as the desired constituent for purification and have a significant concentration of helium (e.g. at least 50 vol % He). In such embodiments, the layers of the bed 6*b* of adsorbent material can be configured and positioned for removal of impurities so that a purified fluid flow has a substantial concentration of He. For instance, the purified fluid flow PFF can have at least 80 vol % He, at least 90 vol % He or between 90 vol % He and 100 vol % He (e.g. between 95 vol % He and 99.999 vol % He).

We have surprisingly found that embodiments of the adsorber 6 that has a bed 6*b* of adsorbent material that includes an activated carbon layer (AC Layer) 6*ac* with certain pre-specified physical parameters can provide improved purification performance for feed fluid flows that have a relatively low concentration of the constituent to be enriched (e.g. hydrogen concentrations of less than 80 vol % or less than or equal to 78.46 vol % for embodiments adapted to purify the feed to form a hydrogen product stream having at least 95 vol % hydrogen) in which the adsorber 6 is utilized in a PSA adsorption process. The impurities within the feed fluid flow can include CO2, carbon monoxide (CO), nitrogen (N2), argon (Ar), aliphatic hydrocarbons ranging from C1 to C6 (e.g. methane, ethane, propane, butane, pentane, and hexane), and aromatic species (e.g. benzene, toluene, xylene, etc.).

In some embodiments, the activated carbon of the activated carbon layer 6*ac* and/or the activated carbon layer 6*ac* can include all of the following pre-selected parameters:

(a) a ratio of total open pore volume (TOPV) to surface area (SA) of greater than 0.59 nm and less than 0.83 nm in which the SA is the BET surface area and the SA ranges from 380 m2/g to 750 m2/g, (b) bulk density of 0.53 g/cc to 0.62 g/cc, (c) a TOPV of 0.45 cc/g to 0.62 cc/g or of between 0.40 cc/g and 0.50 cc/g, and (d) a CO2 heat of adsorption at 0.5 mmol/g CO loading of 5.59 kcal/mole or less (23.39 kilojoules per mole (kJ/mol) or less).

In other embodiments, utilization of a layer of activated carbon 6*ac* in which the activated carbon and/or activated carbon layer 6*ac* has one or more of the following pre-selected parameters has been found to provide surprising improvements in hydrogen recovery and productivity:

(i) a BET surface area (SA) that ranges from 380 m2/g to 750 m2/g;

(ii) a TOPV to SA ratio (TOPV/SA), which has a value greater than 0.59 nm and less than 0.83 nm;

(iii) a CO2 isosteric heat of adsorption at 0.5 millimoles per gram (mmol/g) surface coverage that can be less than or equal to 5.59 kilocalories per gram mole (kcal/gmol) (23.39 kilojoules per mole (kJ/mol));

(iv) a bulk density (tapped density) of the activated carbon layer that is greater than or equal to 0.60 g/cc or is between 0.53 g/cc and 0.62 g/cc;

(v) a TOPV that is 0.53 cc/g or less, or is less than or equal to 0.50 cc/g, or is between 0.45 cc/g and 0.62 cc/g or is between 0.40 cc/g and 0.50 cc/g;

(vi) an activated carbon particulate size range that is between 1 mm in diameter and 5 mm in diameter;

(vii) a layering of activated carbon that provides a total column void fraction (internal and external) in the activated carbon layer 6*ac* that is less than 0.72.

Embodiments can utilize an activated carbon layer 6*ac* that includes one or more of items (i) through (vii) (e.g. a combination of two or more of these items, a combination of three or more of these items, a combination of four or more of these items, a combination of five or more of these items, a combination of six or more of these items, or a combination of all of these items).

Improvement in adsorption functionality that can be provided by adsorbers using a layer of activated carbon 6*ac* within a bed 6*b* of adsorbent material between at least one upstream layer 6*us* and at least one downstream layer 6*ds* can also be appreciated from experimentation and analyses that is discussed further below.

Experiments

In a first experimental example, five different activated carbons were tested (Carbon 1, Carbon 2, Carbon 3, Carbon 4, and Carbon 5) for performance in PSA applications with various feed gas compositions for purification to form a hydrogen product stream. The physical properties of each activated carbon are given in Table 1. The bulk density of the carbons (g/cc of container) was determined in accordance with ASTM Standard D4164, rev 03. The surface area (m2/g) was determined by the BET method noted above. The total open pore volume (TOPV) was determined from the helium density (crystal density) and the mercury density (particle density determined by mercury porosimetry) such that the total open pore volume was determined by (1/[Hg density])−(1/[He density]) in units of cc/g.

TABLE 1

Properties of evaluated activated carbon samples

| Adsorbent | Surface Area ($m^2$/g) | Bulk Density (g/cc) | TOPV (cc/g) | TOPV/SA (nm) |
|---|---|---|---|---|
| Carbon 1 | 924 | 0.61 | 0.55 | 0.59 |
| Carbon 2 | 750 | 0.53 | 0.62 | 0.83 |
| Carbon 3 | 659 | 0.62 | 0.48 | 0.73 |
| Carbon 4 | 638 | 0.60 | 0.45 | 0.71 |
| Carbon 5 | 380 | 0.60 | 0.53 | 1.39 |

As noted above, the ratio of TOPV/SA can provide an estimate of the average pore size of the carbon material.

The hydrogen PSA performance of these various activated carbons was simulated using an in-house adsorption simulator. Specifics of the simulation package are given in Kumar et al, Chemical Engineering Science, 49 (18), 3115, 1994. The feed composition simulated consisted of 0.3 volume percent (vol %) N2, 4.4 vol % methane (CH4), 15.3 vol % CO2, 4.4 vol % CO and balance H2 (e.g. 75.6 vol % H2). For the simulations, the feed pressure was 23.1 bara (22.8 atm) and temperature was 100° F. (38° C.). The PSA adsorption system that was simulated used a ten adsorber PSA cycle, with 2 adsorbers simultaneously on feed, and four pressure equalization steps. The simulated adsorbers of the adsorption system had a two-layer bed design with activated carbon at the feed end of the bed upstream of a 5 A zeolite at the product end of the bed. The purity of the hydrogen product was 5 ppm CO for the simulation.

As noted above, a layer of activated alumina or layers of alumina and silica can be positioned in the bed upstream of the activated carbon layer in some embodiments. But these cases were not simulated in this testing. For the simulation, the total bed length for the bed of adsorbent material was 26.5 ft (8.1 m) and the activated carbon layer was varied from 33-40% of the total bed volume to optimize PSA performance for each simulated activated carbon. The activated carbon for each activated carbon sample that was simulated had an average particle diameter of 1.8 mm and the 5 A zeolite layer had an average particle diameter of 1.7 mm for the conducted simulations.

Table 2, below, provides results from the conducted simulations. For example, Table 2 compares the hydrogen recovery and productivity for each activated carbon sample that was evaluated via the conducted simulations (Carbon 1 through Carbon 5 as identified in Table 1). The hydrogen productivity and recovery were normalized with respect to the performance for the activated carbon with the highest surface area (Carbon 1) which has a TOPV/SA ratio of 0.59 nm.

TABLE 2

Summary of simulation results for the first experimental example

| Activated Carbon | Relative H2 productivity | H2 recovery change (%) |
|---|---|---|
| Carbon 1 | 1.0 | 0 |
| Carbon 2 | 0.99 | −0.12% |
| Carbon 3 | 1.00 | +0.14% |
| Carbon 4 | 1.05 | +0.28% |
| Carbon 5 | 0.84 | −1.59% |

Figure 4:
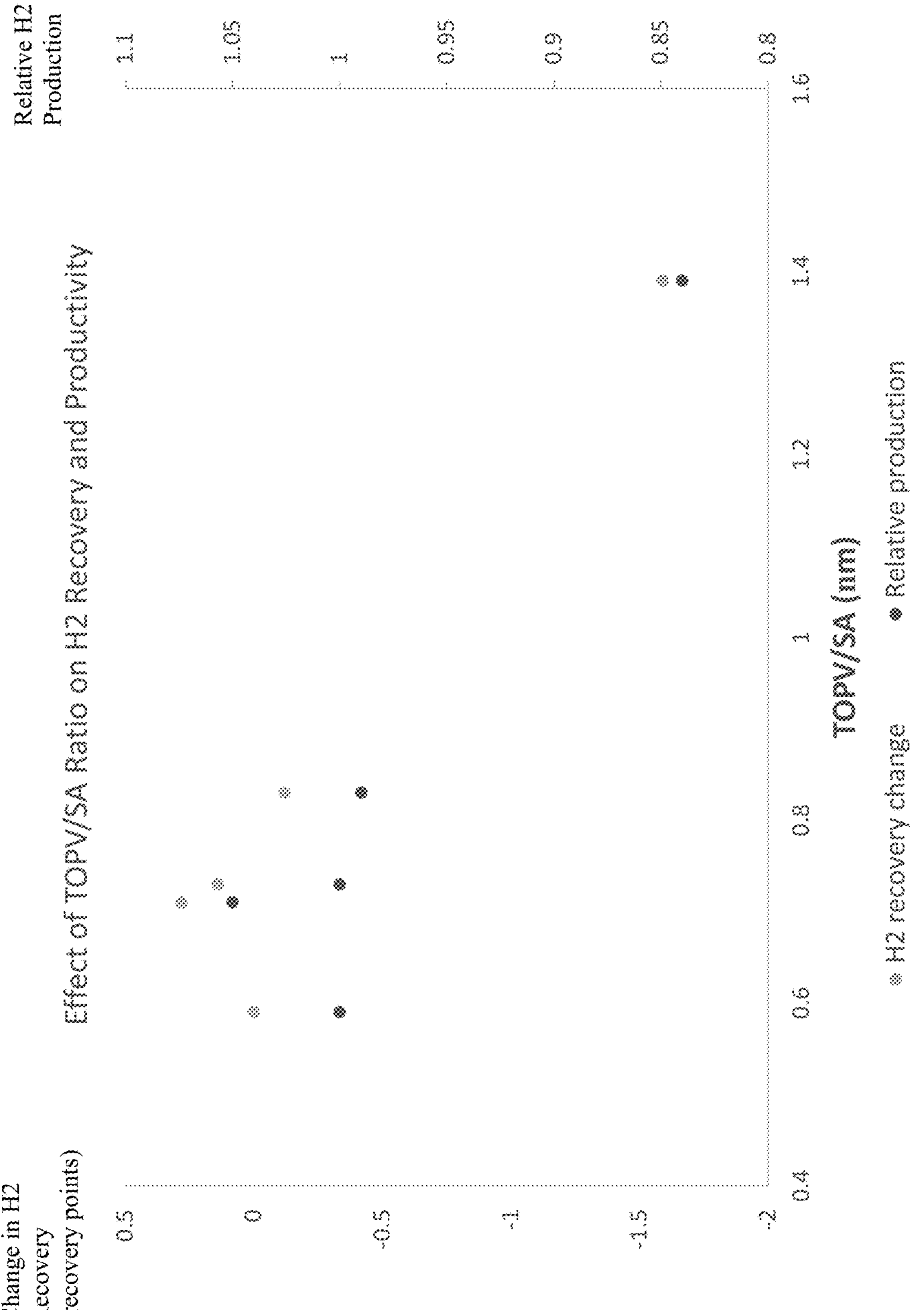
FIG. 4 is a graph illustrating results from an analysis of activated carbon TOPV/SA ratio on hydrogen recovery and productivity.

FIG. 4 shows the effect of the TOPV/SA ratio on the relative hydrogen productivity and recovery from the conducted simulations. These results show that as the ratio of TOPV/SA increased above 0.59 nm, the performance improved and continued until the TOPV/SA ratio reached 0.83 nm.

Figure 5:
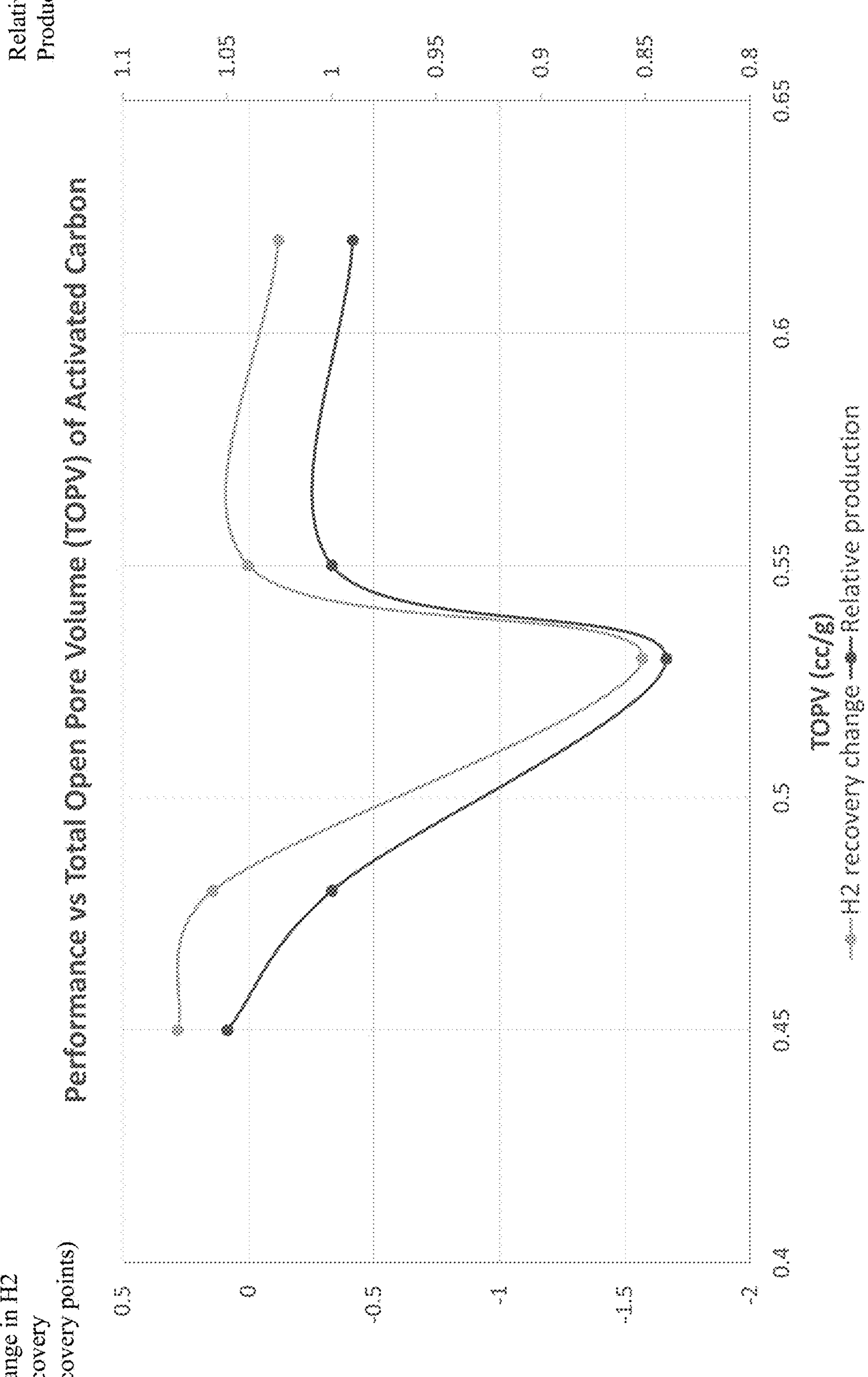
FIG. 5 is a graph illustrating results from an analysis of the TOPV for activated carbon on hydrogen recovery and productivity.

FIG. 5 shows the effect of total open pore volume (TOPV) on the relative hydrogen productivity and recovery that was obtained from the conducted simulations. These results show that as the PSA performance for the simulated adsorption system is relatively unchanged as the total open pore volume decreased from 0.62 cc/g to 0.55 cc/g. But, as the TOPV decreased to 0.53 cc/g, there is a large decrease in PSA performance. Surprisingly, as the TOPV is further decreased to 0.48 and 0.45 cc/g, the PSA showed its best performance. This showed a surprising and unexpected relationship for activated carbon TOPV in which a TOPV of 0.53 cc/g or less or a TOPV of less than 0.50 cc/g can provide improved hydrogen recovery, productivity, and purification.

Figure 6:
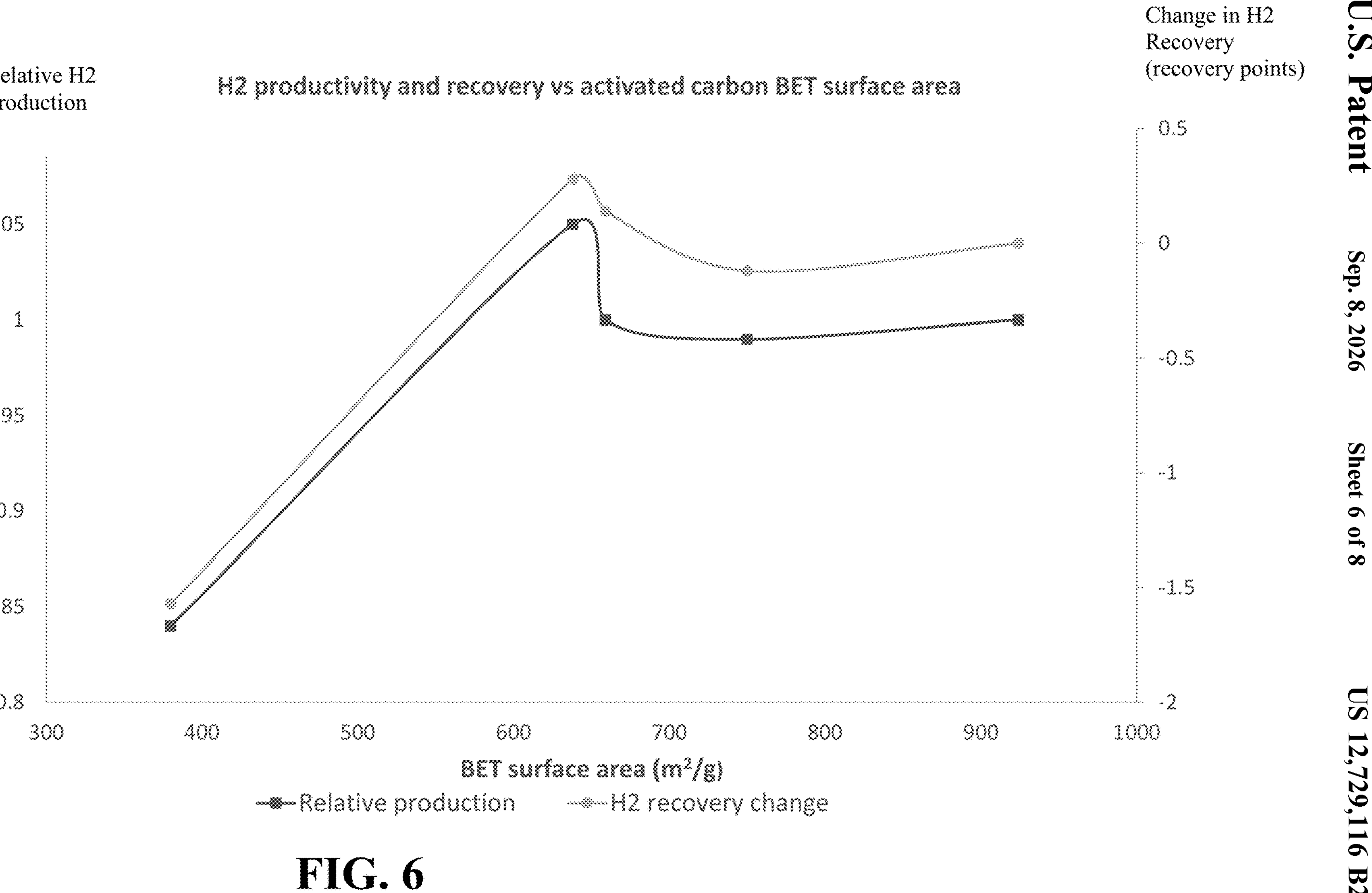
FIG. 6 is a graph illustrating results from an analysis of activated carbon surface area (as calculated via the BET method) on hydrogen recovery and productivity.

FIG. 6 shows the effect of BET surface area on the performance of the simulated adsorption systems using the different activated carbons under the above noted feed gas conditions. As the surface area (determined via the BET method as noted above) decreased from 924 m2/g to 750 m2/g, there was very little change in performance. Yet, when the surface area decreased below 750 m2/g, there is an increase in performance. This improvement, however, ceased to exist after the surface area decreased to 380 m2/g. In fact, under 380 m2/g there was a large drop in performance.

In a second experimental example, two different activated carbon samples were evaluated by simulation for application in an adsorption system process where the feed gas is a refinery off-gas for purification of hydrogen to provide a hydrogen product stream. The feed gas composition was 11.8 vol % methane (CH4), 8.5 vol % ethane (C2H6), 5.2 vol % propane (C3H8), 2.2 vol % butane (C4H10), 1 vol % pentane (C5H12) and 0.5 vol % hexane (C6H14) and the balance H2, which was 70.8 vol % H2 (for this simulation all the hydrocarbons were alkanes). The feed temperature was 104° F. (40° C.) and the feed pressure was 19.4 bara (19.15 atm). The simulated adsorption system had a five adsorber cycle with two steps of pressure equalization. The adsorber bed loading that was simulated contained (from feed to product end): 8 feet (2.44 m) of activated alumina that was upstream of 7.5 feet (2.286 m) of silica gel that was upstream of 10 feet (3.048 m) of activated carbon that was upstream of 5.5 feet (1.6764 m) of 5 A zeolite. The product hydrogen purity was 700 ppm total impurity.

The two activated carbons that were simulated in this simulation were the above noted Carbon 2 (TOPV/SA=0.83 nm, with an SA of 750 m2/g) and the above noted Carbon 3 (TOPV/SA=0.73 nm, with an SA of 659 m2/g). The simulation results showed that activated carbon of Carbon 3 showed improved hydrogen recovery by 0.66 points. This further corroborated the other above noted results that showed that a TOPV/SA ratio that is less than 0.83 nm and a surface area that is less than 750 m2/g improved the overall hydrogen purification performance and that this can be the case for purification applications in steam reforming applications as well as refinery off-gas applications, which can have different feed constituents.

In a third experimental example, another set of simulations were conducted using an example feed gas produced by partial oxidation (POX) of natural gas and then CO2 removal by some CO2 removal process (absorption, adsorption, membranes etc.). The feed gas to the adsorption system in this simulation was 0.9 vol % CO, 0.3 vol % CH4, 0.2 vol % CO2, 0.2 vol % N2, 0.05 vol % argon (Ar) with the balance H2, which was 98.35 vol % H2. The feed temperature was 100° F. (38° C.) and the feed pressure was 33.6 bara (33.16 atm). The process cycle employed a twelve adsorber process with five steps of pressure equalization and three adsorbers simultaneously on feed. The final H2 purity for this simulation was 100 ppm total impurity. The simulated adsorber beds were 2 layer beds that each included 28 feet (8.53 m) of activated carbon on the feed end of the bed and 4 feet (1.22 m) of 5 A zeolite at the product end. In the simulations, the above noted Carbon 2 and Carbon 3 samples were evaluated. The results show that Carbon 2 (TOPV/SA=0.83 nm, with BET SA of 750 m2/g) had a higher H2 recovery by 2.7 points as compared to Carbon 3 (TOPV/SA=0.73 nm, with BET SA of 659 m2/g). This is contrary to the results discussed above where the higher surface area and TOPV/SA ratio activated carbon performed worse. These results show that the use of the embodiments of activated carbon noted above are surprisingly effective for purification of a low $H_2$ content feed and are not well suited for purification processing of a very rich $H_2$ feed (e.g. a feed of over 92 vol % $H_2$ or a feed of over 98 vol % $H_2$).

Figure 7:
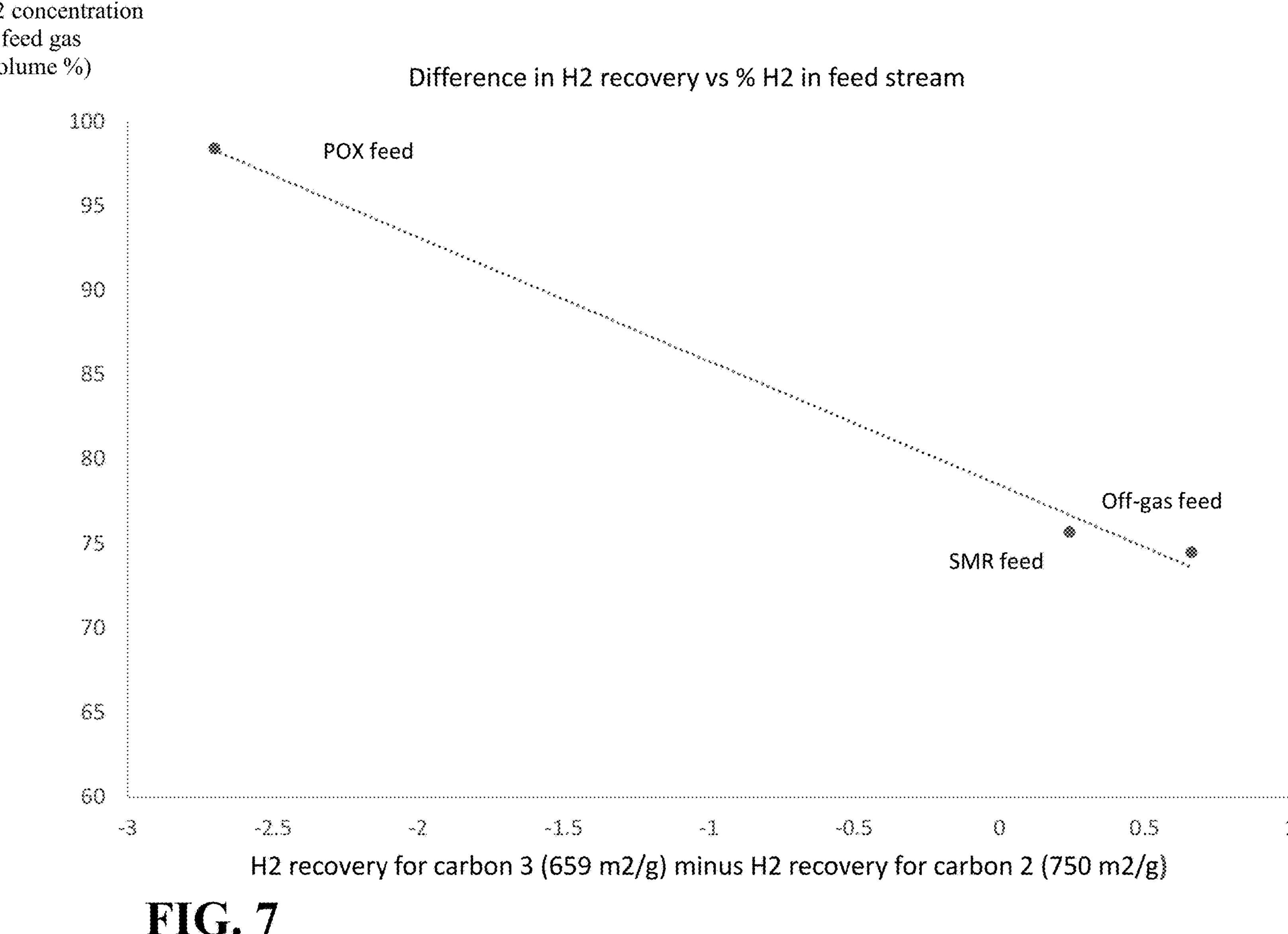
FIG. 7 is a graph illustrates results from an analysis of a difference in hydrogen recovery vs. hydrogen concentration of a feed.

FIG. 7 shows a plot of the $H_2$ recovery determined by the above noted simulations in the above noted experimental examples involving Carbon 2 (TOPV/SA=0.83 nm, with BET SA of 750 m2/g) and Carbon 3 (TOPV/SA=0.73 nm, with BET SA of 659 m2/g). as a function of $H_2$ concentration in the feed stream. The $H_2$ recovery axis shows the difference in $H_2$ recovery between Carbon 2 and Carbon 3. The plot of FIG. 7 shows that at high $H_2$ concentration in the feed gas, the lower surface area, lower TOPV/SA ratio activated carbon performs poorly. However, when the inlet $H_2$ concentration decreases, the lower surface area, lower TOPV/SA activated carbon improves $H_2$ recovery. This is a surprising effect on the feed $H_2$ concentration on $H_2$ purification performance.

FIG. 7 includes a broken line to show a linear relationship between the difference in $H_2$ recovery and inlet $H_2$ concentration as well. The linear fit of the data in FIG. 7 shows that once the inlet $H_2$ concentration is above 78.46 vol %, the activated carbon with surface area less than 750 m2/g and TOPV/SA ratio less than 0.83 nm provides a surprising improvement in $H_2$ recovery and $H_2$ purification.

Figure 8:
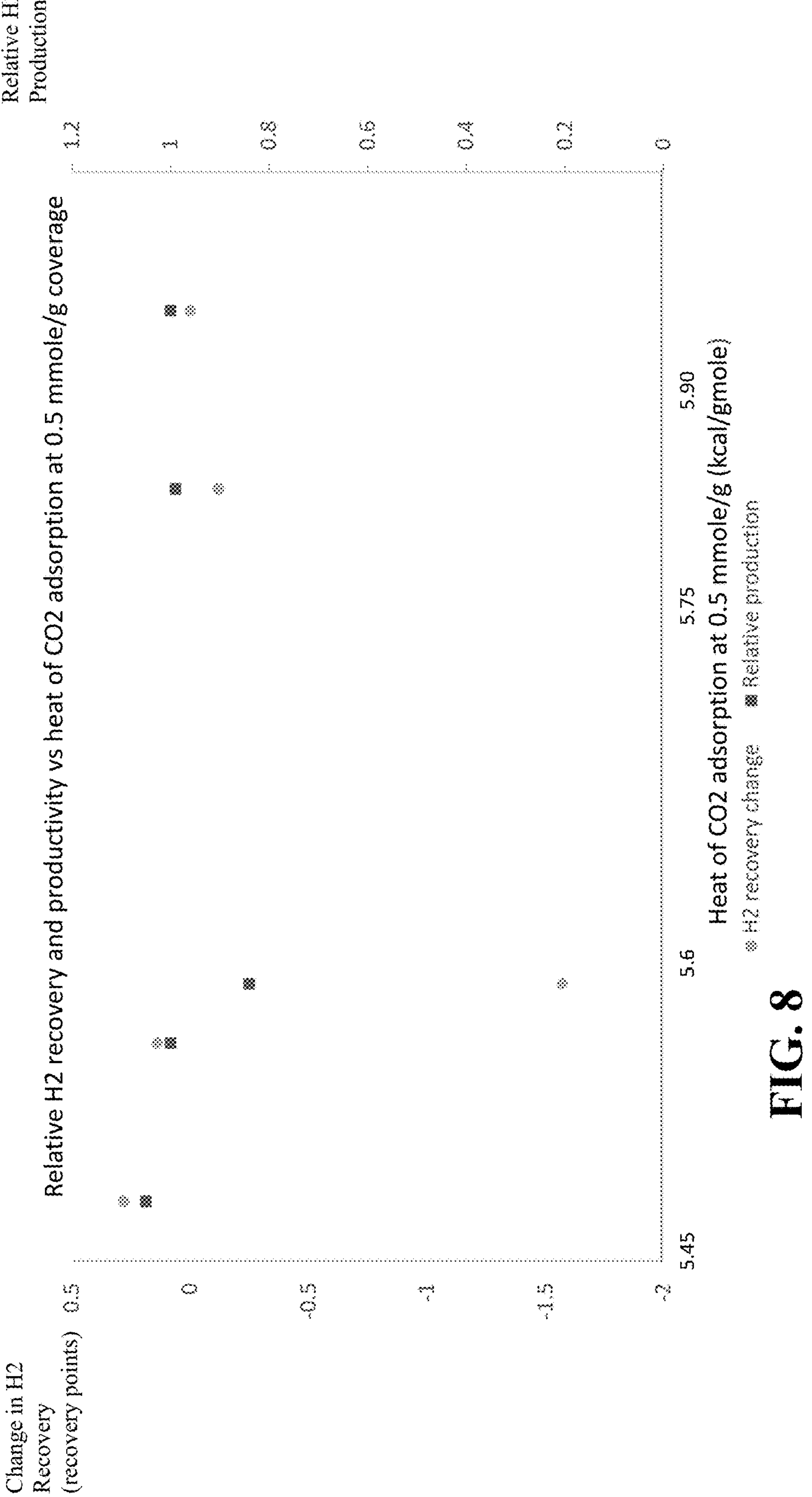
FIG. 8 is a graph illustrating results from an analysis of relative hydrogen recovery and productivity as compared to carbon dioxide adsorption at 0.5 mmol/g coverage.

In yet another experimental example, the isosteric heat of $CO_2$ adsorption was determined on the various activated carbon samples noted above by measuring adsorption isotherms at two different temperatures and using the Clausius-Clapeyron equation $(\ln P1/P2)=q/R\ (1/T1-1/T2)$, where T1 and T2 are the adsorption temperatures in degrees K, R is the gas constant, q is the heat of adsorption and P1 and P2 are the equilibrium pressures at T1 and T2 to achieve a given adsorbate capacity. This methodology is disclosed in Ind. Eng. Chem. Res. 2019, 58, 10984-11002. This equation was used to determine the heat of adsorption as a function of loading. FIG. 8 shows a plot of the measured $CO_2$ heat of adsorption at 0.5 mmol/g capacity vs the $H_2$ recovery and productivity for carbons simulated in the first experimental example. The plot of FIG. 8 shows that as the $CO_2$ heat of adsorption at 0.5 mmol/g loading decreased below 5.59 kcal/gmol (23.39 kJ/mol) the purification performance (recovery and productivity) increased. This work further shows that utilization of an activated carbon layer for adsorption system purification of a feed in which the activated carbon has a TOPV/SA ratio from 0.59 nm to 0.83 nm, surface area between 380 m2/g and 750 m2/g and a $CO_2$ heat of adsorption at 0.5 mmol/g of 5.59 kcal/gmol (23.39 kJ/mol) or less can provide a surprising improvement in purification for forming hydrogen product streams from a feed having a relatively low $H_2$ concentration (e.g. an $H_2$ concentration of under 79 vol % $H_2$, an $H_2$ concentration of between 79 vol % and 50 vol %, etc.).

The experimental results and simulation analyses shows that we have surprisingly found that use of an activated carbon layer 6*ac* as used in exemplary embodiments discussed herein can provide surprisingly improved $H_2$ recovery in $H_2$ purification for feeds having relatively low $H_2$ concentrations (e.g. $H_2$ concentrations of under 79 vol %). We have found that a range of TOPV/SA of 0.59 nm to 0.83 nm in combination with a feed having less than 80 vol % $H_2$ can provide very unexpected, improved results. This TOPV/SA range was found to have a substantial impact on $H_2$ recovery and productivity for low $H_2$ content feeds.

The improvement in $H_2$ purification can be provided in steam reforming, and refinery off gas applications as discussed above. It is also believed similar improvements can be provided for purification of helium (He) since He can be adsorbed similarly to $H_2$. The improvement in purification and recovery can be substantial and commercially significant. For example, some embodiments can provide improved $H_2$ purification that can result in improved $H_2$ productivity after being retrofit with an embodiment of our adsorption system 1 using embodiments of our adsorber(s) 6 to purify a feed having $H_2$ to form a purified $H_2$ product stream. For instance, Table 2 shows that a 5% improvement in $H_2$ productivity relative to a standard activated carbon can be provided (Carbon 4 as compared to Carbon 1). For a 100 million standard cubic feet per day (MMSCFD) $H_2$ plant, a 5% production increase results in an additional $5.5 million/year of revenue for an $H_2$ price of $3 per 1,000 standard cubic feet (SCF) where Carbon 1 is the reference activated carbon used for these comparative improvements because the prior art recites that large surface area activated carbons are typically preferred for this application and Carbon 1 has the highest BET surface area.

Another surprising and unexpected result is the sensitivity $H_2$ recovery and productivity performance was as a function of the TOPV/SA ratio. The TOPV/SA value is an estimate of the average pore diameter of the activated carbon over the total pore structure assuming cylindrical pores as indicated previously. The value of 0.71 nm (Carbon 4) corresponds to an average pore diameter of 2.84 nm while the value of 0.83 (Carbon 1) corresponds to 3.32 nm. A reduction in average pore diameter of only 0.48 nm resulted in very large change in the $H_2$ PSA performance (5% increased productivity and additional 0.28 recovery points of $H_2$ recovery). This very small change in average pore diameter can result in a significant improvement in $H_2$ productivity and recovery.

This sharp sensitivity between TOPV/SA ratio to $H_2$ PSA performance is also demonstrated by comparing performance between Carbon 4 (TOPV/SA=0.71) and Carbon 5 (TOPV/SA=1.39). As the TOPV/SA ratio goes from 0.71 nm (pore diameter=2.84 nm) to 1.39 nm (pore diameter=5.56 nm), the $H_2$ recovery drops by 1.87 points and the $H_2$ productivity decreased by 21%.

A reduction in average pore diameter of only 2.72 nm resulted in very large change in the $H_2$ PSA performance. This very small change in average pore diameter can result in a significant improvement in $H_2$ productivity and recovery. For instance, the type of improvement we found can provide a significant annual revenue increase (e.g. $23 million) based on the improved $H_2$ productivity. The narrow range for average pore size estimation based on the TOPV/SA ratio is very unexpected, especially since this ratio takes into account mesopore and macropore sizing (which can be important for mass transfer properties) as well as micropore sizing (which can be important for equilibrium capacity properties) as noted above.

This improvement is a surprising and unexpected result. For example, improved performance is not expected to be a function of the hydrogen concentration within a feed. It is very surprising that such a condition in which a lower concentration of $H_2$ in a feed would result in an adsorbent material providing improved performance as found in the above noted samples since regardless of the $H_2$ content in the feed gas, the same impurities (e.g. $CO_2$, $CH_4$, $N_2$ and CO) must be removed from the feed stream to produce pure $H_2$.

It should be appreciated that modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the adsorption system 1 for fluid communication of the flows of fluid between different units can be arranged to meet a particular plant layout design that accounts for available area of the plant, sized equipment of the plant, and other design considerations. As another example, the flow rate, pressure, and temperature of the fluid passed through an adsorber as well as passed through other plant elements can vary to account for different plant design configurations and other design criteria. As yet another example, embodiments can be utilized in conjunction with any type of adsorber vessel-radial, vertical, horizontal, vertical cross flow, etc. and the vessel 6*a* of each adsorber 6 can be any size or shape to meet a desired set of design criteria.

It should be appreciated that embodiments of the adsorption system 1 can be configured to include and/or utilize process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of adsorbent material, adsorbers, adsorption systems, adsorption processing, and methods of making and using the same have been shown and described above, it is to be distinctly understood that the invention is not limited thereto but may be otherwise variously embodied and practiced within the scope of the following claims.

The invention claimed is:

1. A process for adsorption, comprising:

positioning a bed of adsorbent material within a vessel of an adsorber, the bed of adsorbent material comprising an activated carbon layer including activated carbon, the activated carbon of the activated carbon layer having:

(i) a surface area (SA) that ranges from 380 $m^2/g$ to 750 $m^2/g$; and (ii) a total open pore volume (TOPV) to SA ratio (TOPV/SA), which has a value greater than 0.59 nm and less than 0.83 nm;

passing a feed fluid flow through the bed of adsorbent material to purify the feed fluid;

outputting a purified fluid flow from the vessel after the feed fluid flow has passed through the bed of adsorbent material; and wherein the feed fluid has a hydrogen content of less than 79 volume percent (vol %) to output a purified fluid flow having a hydrogen content of greater than or equal to 95 vol %.

2. The process of claim 1, wherein the activated carbon also has:

(iii) a carbon dioxide (CO2) isosteric heat of adsorption at 0.5 millimoles per gram (mmol/g) surface coverage that can be less than or equal to 23.39 kilojoules per mole (kJ/mol) and greater than 0 kJ/mol; and (iv) a TOPV that is 0.53 cubic centimeters per gram (cc/g) or less; and wherein the activated carbon layer has a bulk density that is greater than or equal to 0.60 grams per cubic centimeter (g/cc).

3. The process of claim 1, wherein the activated carbon also has:

(iii) a particulate size range that is between 1 millimeter (mm) in diameter and 5 mm in diameter.

4. The process of claim 1, wherein the activated carbon layer also has a bulk density that is between 0.53 grams per cubic centimeter (g/cc) and 0.62 g/cc.

5. The process of claim 4, wherein the activated carbon also has:

(iii) a carbon dioxide (CO2) isosteric heat of adsorption at 0.5 millimole per gram (mmol/g) surface coverage that can be less than or equal to 23.39 kilojoules per mole (kJ/mol) and greater than 0 kJ/mol; and/or (iv) a TOPV that is between 0.50 cubic centimeters per gram (cc/g) and 0.40 cc/g.

6. The process of claim 4, wherein the activated carbon also has:

(iii) a carbon dioxide (CO2) isosteric heat of adsorption at 0.5 millimoles per gram (mmol/g) surface coverage that can be less than or equal to 23.39 kilojoules per mole (kJ/mol) and greater than 0 kJ/mol; and/or (iv) a TOPV that is between 0.45 cubic centimeters per gram (cc/g) and 0.62 cc/g.

7. The process of claim 1, wherein the activated carbon also has a TOPV that is between 0.40 cubic centimeters per gram (cc/g) and 0.50 cc/g.

* * * * *